(12) United States Patent
Robin et al.

(10) Patent No.: US 8,780,705 B2
(45) Date of Patent: Jul. 15, 2014

(54) APPARATUS, COMMUNICATIONS SYSTEM AND METHOD FOR OPTIMIZING DATA PACKET FLOW

(75) Inventors: Jean-Luc Robin, Saint Jean (FR); Jose Mendes-Carvalho, Venerque (FR)

(73) Assignee: Freescale Semiconductor, Inc., Austin, TX (US)

( * ) Notice: Subject to any disclaimer, the term of this patent is extended or adjusted under 35 U.S.C. 154(b) by 212 days.

(21) Appl. No.: 13/258,807

(22) PCT Filed: Apr. 30, 2009

(86) PCT No.: PCT/IB2009/052801
§ 371 (c)(1),
(2), (4) Date: Sep. 22, 2011

(87) PCT Pub. No.: WO2010/125429
PCT Pub. Date: Nov. 4, 2010

(65) Prior Publication Data
US 2012/0039174 A1 Feb. 16, 2012

(51) Int. Cl.
*H04L 12/26* (2006.01)
(52) U.S. Cl.
USPC ......... 370/229; 370/230.1; 370/235; 370/253
(58) Field of Classification Search
USPC ........... 370/216, 229, 230, 230.1, 235, 235.1, 370/236, 253, 363, 381, 395.71, 412, 419
See application file for complete search history.

(56) References Cited

U.S. PATENT DOCUMENTS

| | | | |
|---|---|---|---|
| 6,078,564 A | 6/2000 | Lakshman et al. | |
| 6,215,769 B1 * | 4/2001 | Ghani et al. | 370/230 |
| 6,252,851 B1 | 6/2001 | Siu et al. | |
| 6,438,108 B1 | 8/2002 | Kanljung et al. | |
| 6,894,974 B1 * | 5/2005 | Aweva et al. | 370/230.1 |
| 7,020,083 B2 | 3/2006 | Garcia-Luna-Aceves et al. | |
| 7,047,312 B1 * | 5/2006 | Aweya et al. | 709/235 |
| 2001/0017844 A1 * | 8/2001 | Mangin | 370/231 |
| 2002/0176443 A1 * | 11/2002 | Wei et al. | 370/468 |
| 2004/0215753 A1 * | 10/2004 | Chan et al. | 709/223 |
| 2006/0146853 A1 * | 7/2006 | Paila | 370/428 |
| 2007/0218938 A1 | 9/2007 | Carter | |
| 2008/0117877 A1 * | 5/2008 | Min et al. | 370/331 |

FOREIGN PATENT DOCUMENTS

| | | |
|---|---|---|
| WO | 00/21233 A | 4/2000 |
| WO | 02/33909 A | 4/2002 |
| WO | 02/052800 A | 7/2002 |

OTHER PUBLICATIONS

International Search Report and Written Opinion correlating to PCT/IB2009/052801 dated Dec. 16, 2009.

* cited by examiner

*Primary Examiner* — Kwang B Yao
*Assistant Examiner* — Nguyen Ngo

(57) ABSTRACT

A datagram flow optimizer apparatus comprises a buffer resource capable of receiving and temporarily storing a plurality of datagrams in respect of a forward path. The apparatus also comprises and a buffer controller arranged to implement, when in use, buffering of received datagrams by the buffer resource until a predetermined threshold number of datagrams has been stored by the buffer resource. The apparatus further comprises an acknowledgement regulator arranged to use the buffer resource to manipulate temporal spacing between acknowledgements of datagrams on a reverse path. The buffer controller is arranged to permit forwarding on the forward path of datagrams stored by the buffer resource in response to the predetermined threshold number of stored datagrams being reached.

20 Claims, 9 Drawing Sheets

APPARATUS, COMMUNICATIONS SYSTEM AND METHOD FOR OPTIMIZING DATA PACKET FLOW

FIELD OF THE INVENTION

This invention relates to a datagram flow optimizer apparatus of the type that, for example, is located between a source of datagrams and a destination for the datagrams and modifies a flow of the datagrams between the source and the destination. The present invention also relates to a communications system of the type that, for example, communicates datagrams between a source of datagrams and a destination for the datagrams. The present invention further relates to a method of optimizing datagram flow, the method being of the type that, for example, communicates datagrams from a source of the datagrams to a destination for the datagrams.

BACKGROUND OF THE INVENTION

In the field of communications, particularly but not exclusively wireless communications, it is known to communicate data in datagrams, the datagrams traversing a communications network from a source node to a destination node or a communications fabric between the source node and the destination node. In order to ensure reliable communication of the datagrams between the source node and the destination node, a so-called flow control protocol is employed. The flow control protocol is usually one of a number of protocols employed in a communications system between the source and destination nodes. In this respect, an Open Systems Interconnection model is a common reference model for a so-called protocol stack employed at the source and destination nodes. In relation to flow control, a common protocol employed is a Transmission Control Protocol (TCP), which is one of the core protocols of an Internet Protocol suite. The TCP is defined over a number of Requests for Comments (RFCs) available from the Internet Engineering Task Force (IETF). One aspect of the TCP is congestion avoidance as defined in RFC 2581.

Electronic devices, for example portable communications devices, comprise so-called "application processors" that receive the datagrams, for example TCP segments, and confirm receipt of the TCP segments by sending acknowledgement messages (ACKs) respectively in reply to the receipt of the TCP segments in order to confirm receipt thereof. Furthermore, the electronic devices are usually powered by portable power sources, for example rechargeable cells, the capacity or remaining charge of which needs to be conserved as much as possible to enable the electronic device to operate for as long a period of time as possible. The application processor therefore usually implements a number of power conservation measures in the form of modes of operation that consume varying amounts of electrical power, for example: a Wait or Doze mode, a Stop mode and/or a Sleep Mode. In some circumstances, the provision of the sleep mode in respect of the application processor enables the electronic device to enter a so-called "Deep Sleep Mode", whereby the electronic device can conserve energy.

In one known scenario, a processing resource within a communications network, for example a in a Node B of a Universal Mobile Telecommunications System (UMTS) Terrestrial Radio Access Network (UTRAN), receives TCP segments from a source node attached or coupled to the Internet at a rate of receipt. The TCP segments are addressed to a destination node associated with the application processor of the electronic device. In this example, the electronic device is a User Equipment (UE) unit of a UMTS communications network. The Node B is therefore used to transmit the TCP segments to the UE over a Radio Frequency (RF) interface of the TCP segments by the UTRAN. At the UE unit, a modem processor of the UE unit receives the TCP segments at a rate corresponding to the rate of receipt. The modem processor communicates the received TCP segments to the application processor of the UE at a corresponding rate of receipt.

Referring back to the power saving features of the application processor, in order to be able to enter the Sleep Mode and therefore conserve maximum electrical power, a sufficient amount of time has to elapse during which data is not received by the application processor before the Sleep Mode can be entered by the application processor. If TCP segments are being received at a sufficiently fast rate that the application processor does not remain idle for the necessary amount of time required for the Sleep Mode to be entered, the application processor simply transitions between the lesser power conserving Wait and Stop modes. Consequently, the application processor does not get an opportunity to enter the sleep mode and less power is conserved by the UE and hence battery life is reduced.

Additionally, repeated interruption of the application processor in order to process TCP segments and transmit ACKs back to the source node via the modem processor consumes Millions of Cycles Per Second (MCPS) of the application processor. As the application processor is only capable of supporting a finite number of MCPS, consumption of the MCPS in relation to generation of ACKs and processing of received TCP segments results in a corresponding reduction in the available MCPS for other applications, for example: video telephony, Internet browsing and/or voice switched telephony. Consequently, if insufficient MCPS are available, data throughput in respect of receipt of TCP segments is reduced. Additionally, the quality of one or more of the applications being supported by the application processor will have to be downgraded in order for sufficient MCPS to be available to support all applications running.

In order to reduce transmission of ACKs and hence attempt to improve performance efficiency, it is known to employ various ACK filtering techniques, for example as described in U.S. Pat. Nos. 6,078,564 and 6,438,108. However, such techniques sacrifice the Quality of Service (QoS) associated with communication of the TCP segments when multiple streams of data are employed. Furthermore, filtering of the ACKs consumes MCPS, because the application processor has to "read into" the TCP ACKs. As filtering of ACKs can only be supported correctly using "byte counting", implementation of ACK counting in TCP stacks reduce data throughput in the communications network. Also, ACK filtering creates bursts of ACKs that reduces throughput. Consequently, RFC specifications do not recommend use of ACK filtering except in cases of asynchronous communications links. Additionally, ACK filtering does not work with the IPSEC suite of protocols for securing Internet Protocol (IP), and when the so-called "SACK" option is employed, as in 2.5G, 3G, 3.5G and Wireless Local Area Network standards.

SUMMARY OF THE INVENTION

The present invention provides a datagram flow optimizer apparatus as described in the accompanying claims.

The present invention provides an integrated circuit as described in the accompanying claims.

The present invention provides a communications system as described in the accompanying claims.

The present invention provides a method of optimizing datagram flow as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
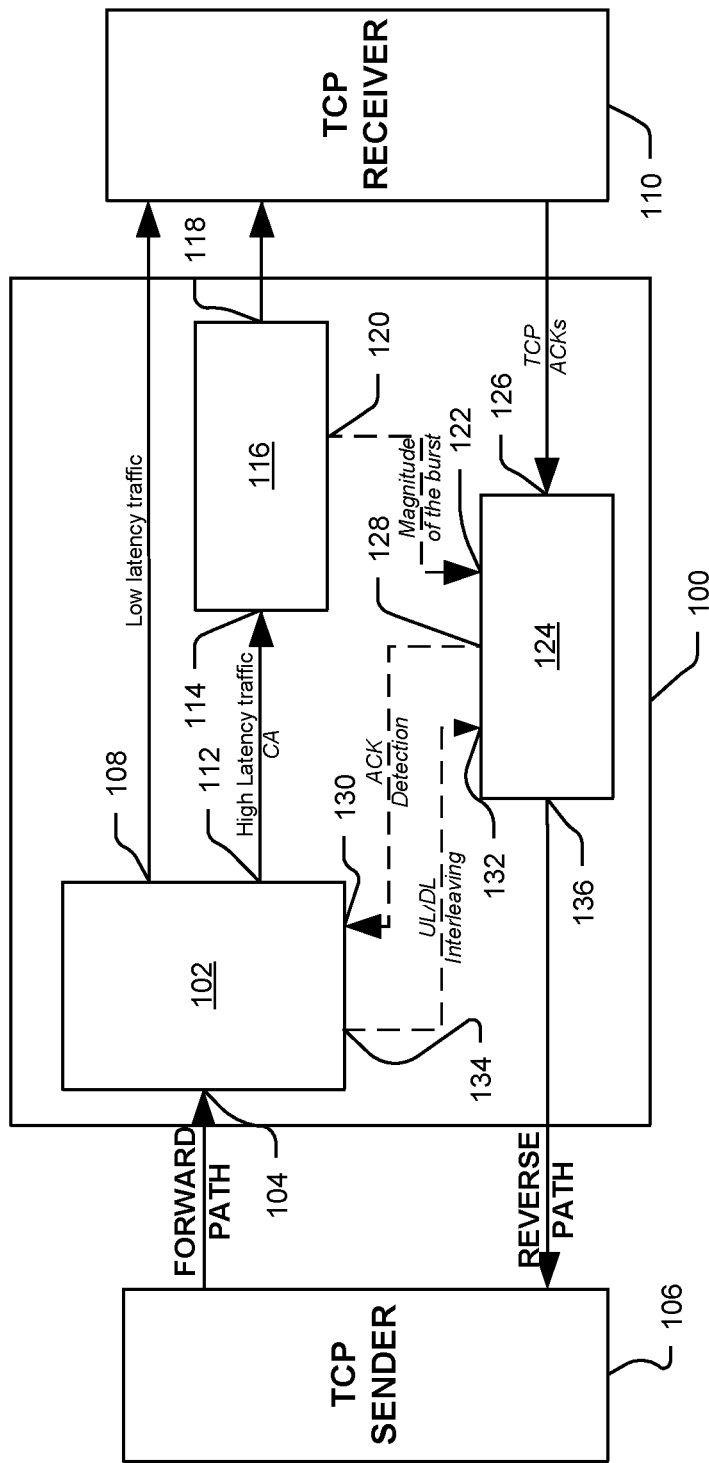
FIG. 1 is a schematic diagram of a datagram flow optimizer apparatus in overview constituting an embodiment of the invention.

Throughout the following description, identical reference numerals will be used to identify like parts.

Referring to FIG. 1, a datagram flow optimizer apparatus 100 may comprise a flow control mode detector 102 having a first input 104 coupled to a first input path of communications circuitry (not shown) for receiving data from a source node 106. A first output 108 of the flow control mode detector 102 may be coupled to a first output path of the communications circuitry for sending data to a destination node 110. A second output 112 of the flow control mode detector 102 is coupled to an input 114 of a datagram scheduler 116, a first output 118 of the datagram scheduler 116 also being coupled to the first output path of the communications circuitry. A second output 120 of the datagram scheduler 116 is coupled to a first input 122 of an acknowledgement regulator 124. A second input 126 of the acknowledgement regulator 124 is coupled to a second input path of the communications circuitry for receiving data from the destination node 110. A first output 128 of the acknowledgement regulator 124 is coupled to a second input 130 of the flow control mode detector 102. An interleaving port 132 of the acknowledgement regulator 124 is coupled to a corresponding interleaving port 134 of the flow control mode detector 102. A second output 136 of the acknowledgement regulator 124 is coupled to a second output path of the communications circuitry for communication of data to the source node 106.

From references herein to the first and second input paths and the first and second output paths, the skilled person should readily appreciate that the datagram flow optimizer apparatus 100 can be disposed in or integrally formed with any suitable communications circuitry as will be described in greater detail later herein. In this respect, the datagram flow optimizer apparatus 100 can be implemented in a network protocol stack associated with, for example, over-the-air communications, such as comprising protocols relating to Layers 1, 2 and 3 of the OSI model.

Figure 2:
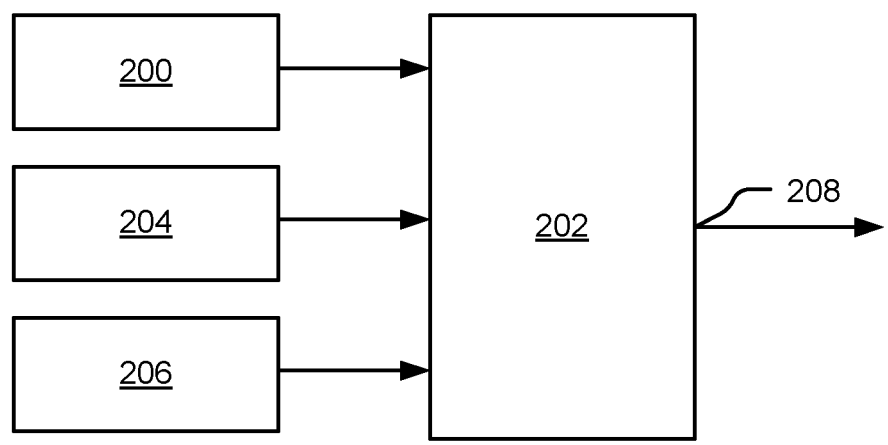
FIG. 2 is a schematic diagram of a flow control mode detector for the apparatus of FIG. 1.
Figure 2:
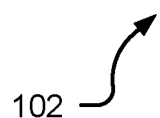

Referring to FIG. 2, the flow control mode detector 102 may comprise a data size measurement module 200 coupled to a combinatorial logic module 202, an inter-arrival time measurement module 204 coupled to the combinatorial logic module 202, and an acknowledgement detector module 206 also coupled to the combinatorial logic module 202. The combinatorial logic module 202 also has a mode detect output 208.

Figure 3:
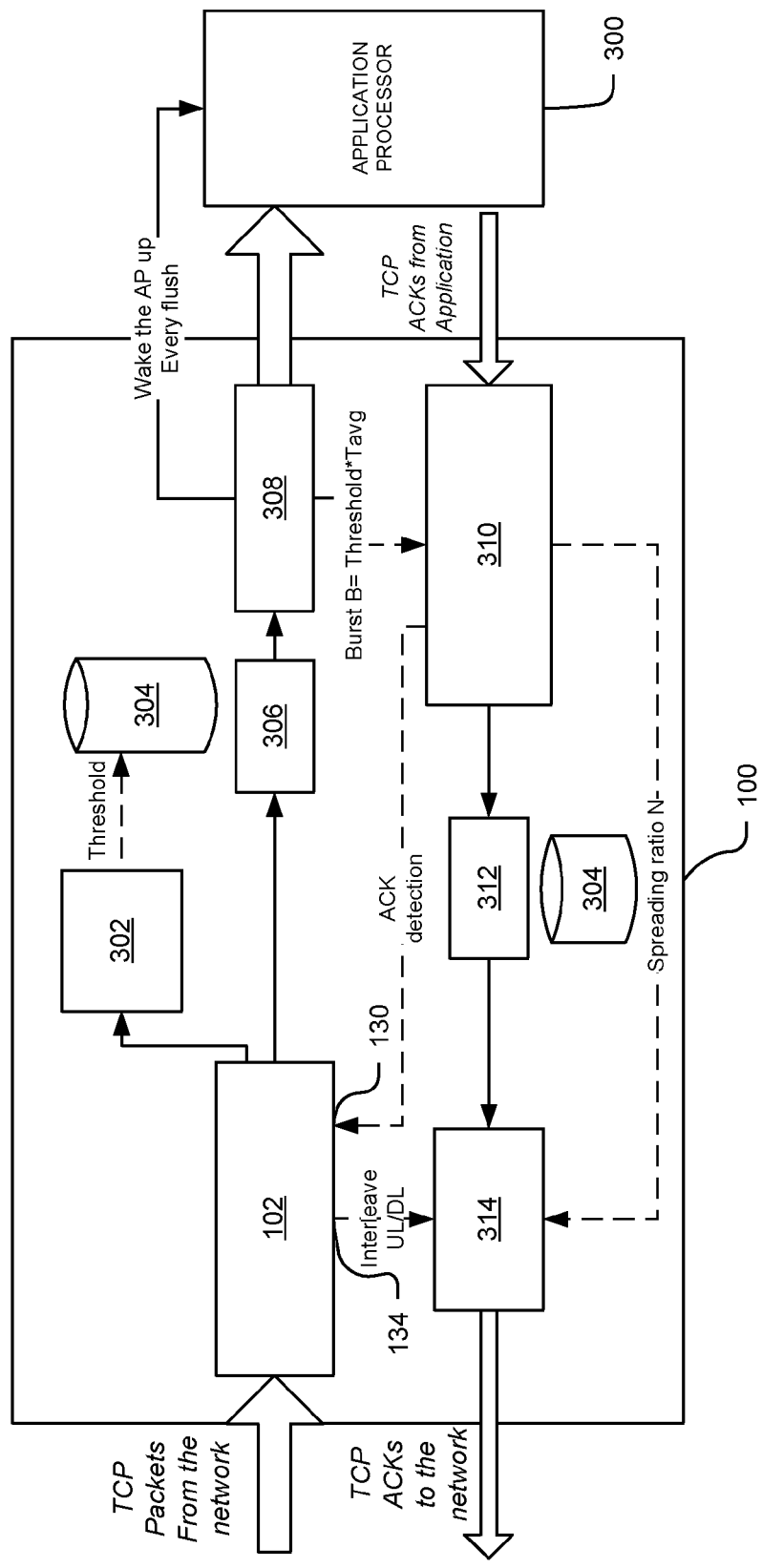
FIG. 3 is a schematic diagram of the apparatus of FIG. 1 in greater detail.

Referring to FIG. 3, in one example implementation where datagrams are communicated from a modem processor, comprising the datagram flow optimizer apparatus 100 to an application processor 300 of the destination node, for example a User Equipment (UE) unit of a UMTS communications network (not shown), the flow control mode detector 102 may also be coupled to a threshold control module 302 that is capable of accessing a data store 304 where a variable can be stored relating to a buffer threshold. In this example, the datagram scheduler 116 of FIG. 1 comprises a forward queue 306, constituting a buffer resource, coupled to a queue flushing module 308. Together, the flow control mode detector 102 and the queue flushing module 308 serve to control the forward queue 306. The acknowledgement regulator 124 of FIG. 1 may comprise, in this example, a spread measurement module 310, the spread measurement module 310 being coupled to the first output 128 of the acknowledgement regulator 124 and hence the second input 130 of the flow mode control detector 102. The spread measurement module 310 is capable of accessing the data store 304 in order to store another variable, relating to a spreading ratio, N, and is also coupled to the second input path of the communications circuitry and a reverse queue 312, which can be part of the buffer resource, the reverse queue 312 being coupled to an acknowledgement release module 314. The acknowledgement release module 314 is coupled to the interleaving port 132 of the acknowledgement regulator 124 and hence the corresponding interleaving port 134 of the flow control mode detector 102. The acknowledgement release module 314 is coupled to the second output path of the communications circuitry, and also has access to the data store 304 where the another variable relating to the spreading ratio, N, is stored. Hence, it can be seen that the acknowledgement regulator 124 may comprise the spread measurement module 310, the reverse queue 312 and the acknowledgement release module 314.

Figure 4:
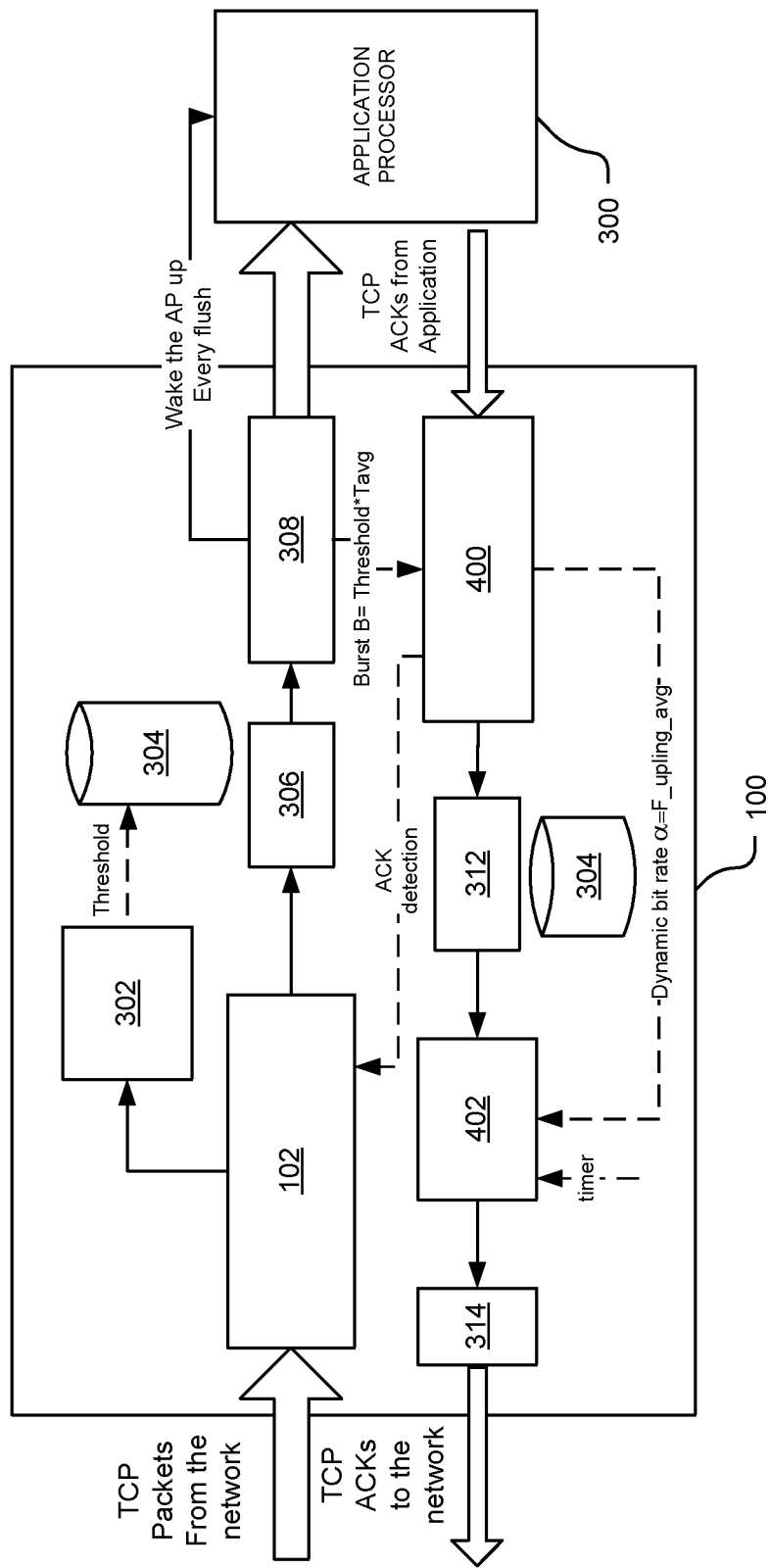
FIG. 4 is a schematic diagram of an alternative implementation to the apparatus of FIG. 3 and constituting another embodiment of the invention.

Turning to FIG. 4, in an alternative example, the queue flushing module 308 is coupled to a reverse path frequency measurement module 400 in place of the spread measurement module 310, the reverse path frequency measurement module 400 being coupled to the reverse queue 312. Whilst the reverse queue 312 is still coupled to the acknowledgement release module 314, the coupling is via a bit rate extraction module 402. Hence, in this example, the acknowledgement regulator 124 may comprise the reverse path frequency measurement module 400, the reverse queue 312, the bit rate extraction module 402 and the acknowledgement release module 314.

Operation of the datagram flow optimizer apparatus 100 will now be described in the context of the source node 106 being coupled to the Internet via an Internet Service Provider (ISP) and capable of communicating with the application processor 300 of the UE unit mentioned above.

In operation (FIG. 5), the datagram flow optimizer apparatus 100 is supported by a modem processor 500 of the UE unit. The datagram flow optimizer apparatus 100 may receive TCP segments from the source node 106 on a forward path and at a forward path rate, $f_{dlink}$. Referring to FIG. 6, at the datagram flow optimizer apparatus 100, the flow control mode detector 102 via the threshold control module 302, may set (Step 600) an initial buffer size threshold value, for example to a value that corresponds to at least about 5 TCP segments, which is incrementally increased with time, as will be described later herein. The buffer size may be increased to more than about 10 TCP segments, for example a value less than about 50 TCP segments, such as about 20 TCP segments. In this respect, the threshold control module 302 can be configured to receive an advertised window size obtained from an ACK message or pre-stored in relation to operation of an operating system, and to incrementally increase the buffer size threshold up to a proportion of the advertised window size. In this example, the proportion of the advertised window size is about half the advertised window size. The advertised window size can be a value that is less than or equal to a maximum window size. The flow control mode detector 102 receives the TCP segments sent on the forward path from the source node 106.

Using the data size measurement module 200, the flow control mode detector 102 measures the size of TCP segments received during a predetermined period of time from a Node B of a UTRAN of the UMTS network and via the RF interface thereof. Also, using the inter-arrival time measurement module 204, the flow control mode detector 102 also measures the inter-arrival time between TCP segments received over the predetermined period of time. In response to receipt of a substantially constant TCP segment size being detected, the data size measurement module 200 generates a logic HIGH signal. Similarly, in response to receipt of a substantially constant inter-arrival time between TCP segments, the inter-arrival time measurement module 204 also generates a logic HIGH signal. Additionally, the acknowledgement detector module 206 determines if acknowledgement messages (ACKs) are being received from the application processor 300 in response to the TCP segments sent by the source node 106. In the event that ACKs are being received, the acknowledgement detector mode 206 also generates a logic HIGH signal. Receipt of ACKs is communicated by the acknowledgement regulator 124, for example by the spread measurement module 310 (FIG. 3) or the reverse path frequency measurement module 400 (FIG. 4).

When logic HIGH signals are received from the data size measurement module 200, the inter-arrival time measurement module 204 and the acknowledgement detector module 206, the combinatorial logic module 202, in this example an AND logic gate having three inputs, generates a logic HIGH output signal.

The detection of TCP segments of constant size and having a constant inter-arrival time, and the detection of the presence of ACKs on the reverse path sent by the application processor 300 are, together, indicative that the TCP implemented in the respective protocol stacks of the source node 106 and the applications processor 300, is in a steady state, for example a congestion avoidance phase. Hence, the flow control mode detector 102 determines (Step 602) whether the communication of TCP segments between the source node 106 and the application processor 300 is in the congestion avoidance phase. The congestion avoidance phase is an example of a delay tolerant flow control mode.

If the congestion avoidance phase is not detected, for example if the TCP is currently in the so-called "slow start" phase, a QoS conversational situation exists, for example to support Voice over IP (VoIP) communications, a streaming situation exists requiring a constant packet inter-arrival time, or any other latency intolerant phase or situation, the flow control mode detector 102 is set (Step 604) to a passthrough mode and TCP segments received from the source node 106 are simply communicated to the application processor 300 without buffering. However, in the event that the flow control mode detector 102 determines that the TCP is in the congestion avoidance phase, then the TCP segments received are passed (Step 606) to the forward queue 306 for buffering. Thereafter, using the buffer size threshold value stored by the data store, the queue flushing module 308 monitors (Step 608) the size of the forward queue 306 in order to determine whether the forward queue size has exceeded the buffer size threshold value. In the event that the buffer size threshold value has not been exceeded, the forward queue 306 continues to fill with TCP segments directed thereto by the flow control mode detector 102.

Figure 5:
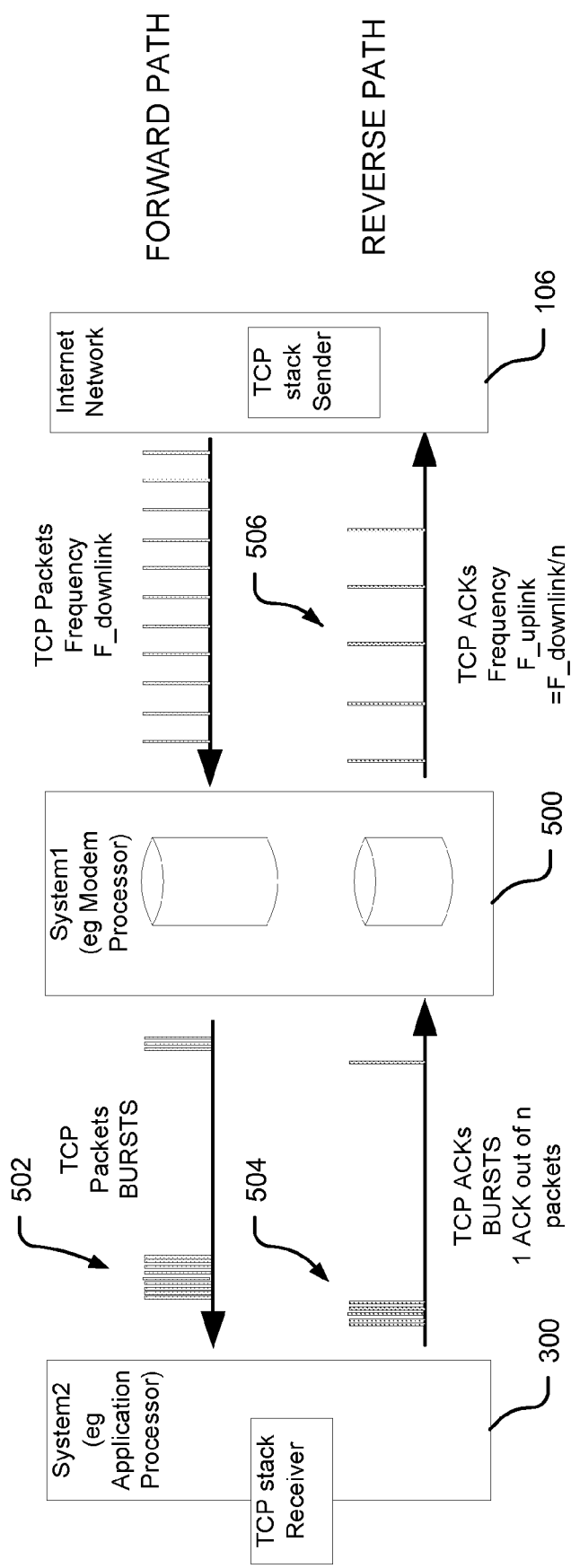
FIG. 5 is a schematic diagram of data being communicated by a system comprising any of the apparatus of FIG. 1, 3 or 4.
Figure 6:
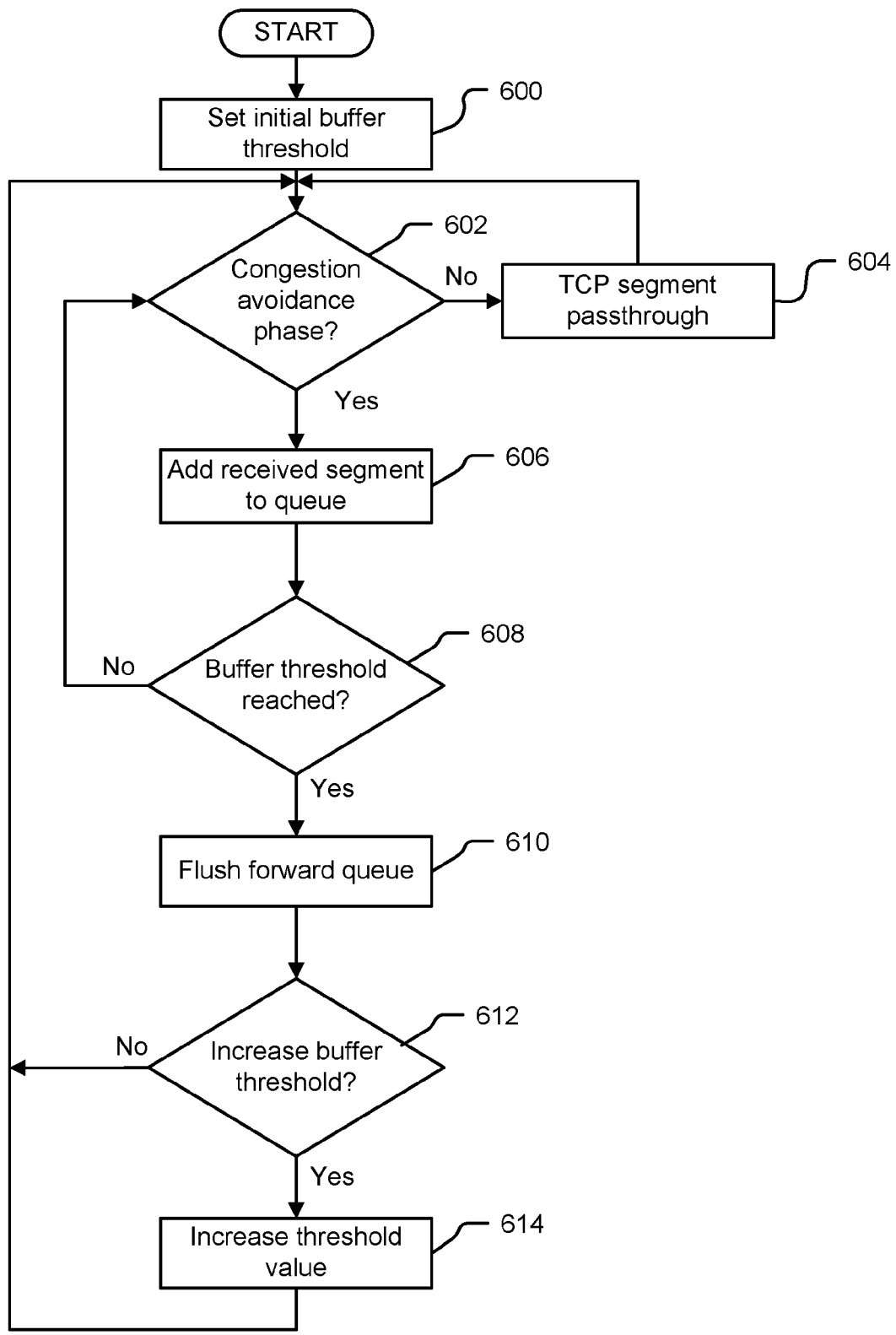
FIGS. 6 to 9 are flow diagrams of respective parts of a method of optimizing datagram flow in respect of the apparatus of any of FIG. 1, 3 or 4.

Once the buffer size threshold value has been reached, the queue flushing module 308 empties (Step 610) the forward queue 306 by "releasing" the TCP segments stored by the forward queue for communication on the forward path to the application processor 300 by the UTRAN as a "burst" of TCP segments 502 (FIG. 5). Thereafter, the threshold control module 302 determines (Step 612) whether the buffer size threshold value should be incrementally increased, for example if the proportion of the advertised window size has not been reached, and if the buffer size threshold value can be increased, the threshold control module 302 increases (Step 614) the buffer size threshold value, by a predetermined increment size, for example 1 segment, 2 segments, 5 segments, or more. The incremental increase of the buffer size threshold value prevents unnecessary triggering of the retransmission timeout in respect of the source node 106. In another embodiment, it can be desirable to reduce the buffer size threshold value, for example where the buffer size threshold value is interfering with the congestion avoidance mode.

Once the forward queue 306 has been flushed and the buffer size threshold value considered and/or set, the above-described process (Steps 602 to 614) are repeated.

At the application processor 300, the application processor 300 is in a sleep mode prior to receipt of the burst of TCP segments via the UTRAN. However, upon receipt of the burst of TCP segments, the application processor 300 receives an interrupt and awakens from the sleep mode and processes the TCP segments received and, in accordance with the TCP, the application processor 300 generates ACKs for communication using the RF circuitry of the UE unit to the Node B (not shown). Consequently, a burst of ACKs 504 is received by the datagram flow optimizer apparatus 100 from the application processor 300.

In order to avoid bursty reverse path traffic between the datagram flow optimizer apparatus 100 and the source node 106, and hence a reduction in throughput of network traffic traversing the UMTS, the acknowledgement regulator 124 serves to "even out" spacings between ACKs received by the datagram flow optimizer apparatus 100 as bursts of ACKs by manipulating temporal spacing between ACKs on the reverse path. Hence, by maintaining a constant uplink data rate, the network maintains an optimal downlink data rate, thereby avoiding so-called network "under-run" that can lead to asynchronism between forward and reverse paths and hence a reduction in bandwidth on the downlink.

Two different arrangements for the acknowledgement regulator 124 are set out above. Operation of each of the arrangements of FIGS. 3 and 4 will therefore now be described separately.

Figure 7:
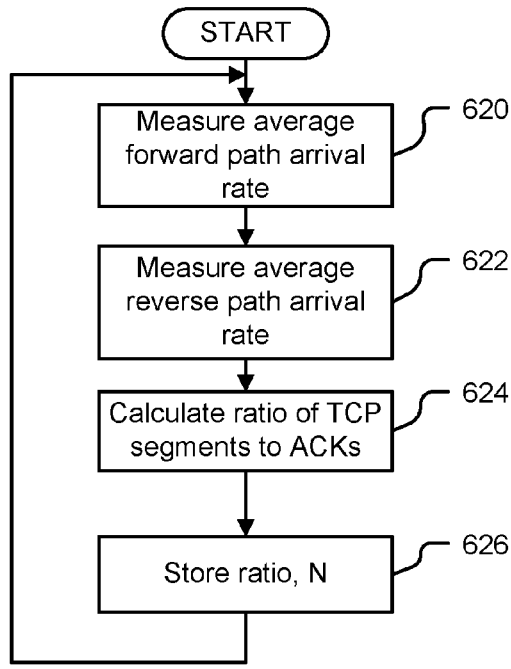

Turning to FIGS. 3 and 7, the spread measurement module 310, using data generated by the flow control mode detector 102, measures (Step 620) an average forward path TCP segment arrival rate, $f_{ave\_dlink}$, over a predetermined period of time exceeding the time required to receive the TCP segments that fill the forward queue 306. In this respect, the sample size for calculation of the average forward path arrival rate, $f_{ave-dlink}$, can exceed the buffer size threshold value. The duration of the predetermined period of time can depend upon the radio access technology employed, for example about 200 ms for High-Speed Downlink Packet Access (HSDPA). Similarly, the spread measurement module 310 monitors ACKs received from the application processor 300 and measures (Step 622) an average reverse path ACK arrival rate, $f_{ave\_ulink}$ in respect of a period of time exceeding the time required to transmit the contents of the reverse queue 312. In this respect, the sample size for calculation of the average reverse path arrival rate, $f_{ave\_ulink}$, can exceed the buffer size threshold value. Thereafter, the spread measurement module 310 calculates (Step 624) a ratio of the measured average forward path arrival rate, $f_{ave\_dlink}$, to the measured average reverse path arrival rate, $f_{ave\_ulink}$, the ratio constituting a so-called spreading ratio, N. The spreading ratio, N, is then stored (Step 626) in the data store 304. In this respect, the skilled person should appreciate that a given TCP policy employed by a receiver of TCP segments does not usually require generation and sending of an ACK for each TCP segment received, but rather one ACK in respect of a number of received TCP segments.

Figure 8:
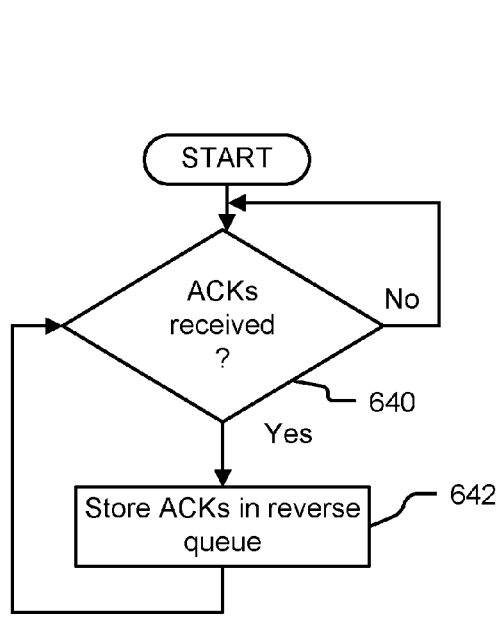

Referring to FIG. 8, the spread measurement module 310 also awaits (Step 640) receipt of bursts of ACKs sent by the application processor 300. Upon detection of receipt of one or more ACKs, the spread measurement module 310 stores (Step 642) the received ACK(s) in the reverse queue 312.

Figure 9:
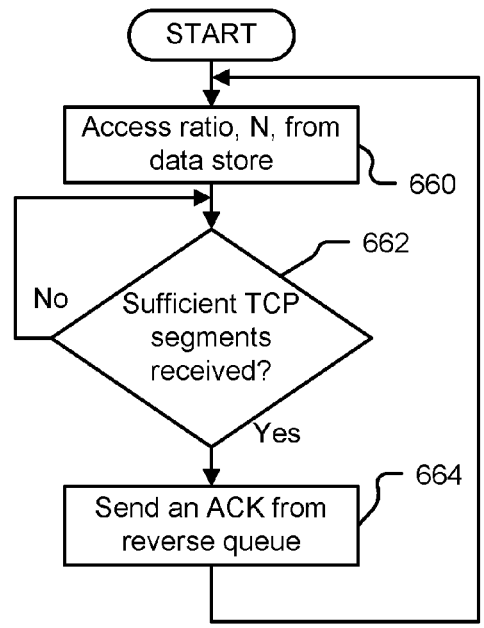

The acknowledgement release module 314 (FIG. 9) accesses (Step 660) the spreading ratio, N, from the data store 304. The flow control mode detector 102 provides a clock signal via the interleaving port 134 thereof to indicate when a TCP segment has been received. Using the clocking signal generated by the flow control mode detector 102, the acknowledgement release module 314 determines (Step 662) whether a sufficient number of TCP segments have been received in order to merit sending an ACK from the reverse queue 312 in order to comply with the spreading ratio, for example 1 ACK for every 3 TCP segments.

Once a sufficient number of TCP segments have been received, the acknowledgement release module 314 sends (Step 664) an ACK using the RF circuitry of the UE unit to the node B for onward transit to the source node 106. Consequently, ACKs received from the application processor 300 in bursts, as a result of the TCP segments being sent by the datagram flow optimizer apparatus 100 to the application processor 300 in bursts in order to provide further opportunities for the application processor 300 to enter a deep sleep mode, are spread out 506 on the reverse path according to the spreading ratio, N, so as to be interleaved with the TCP segments transmitted on the forward path between the source node 106 and the datagram flow optimizer apparatus 100.

Figure 10:
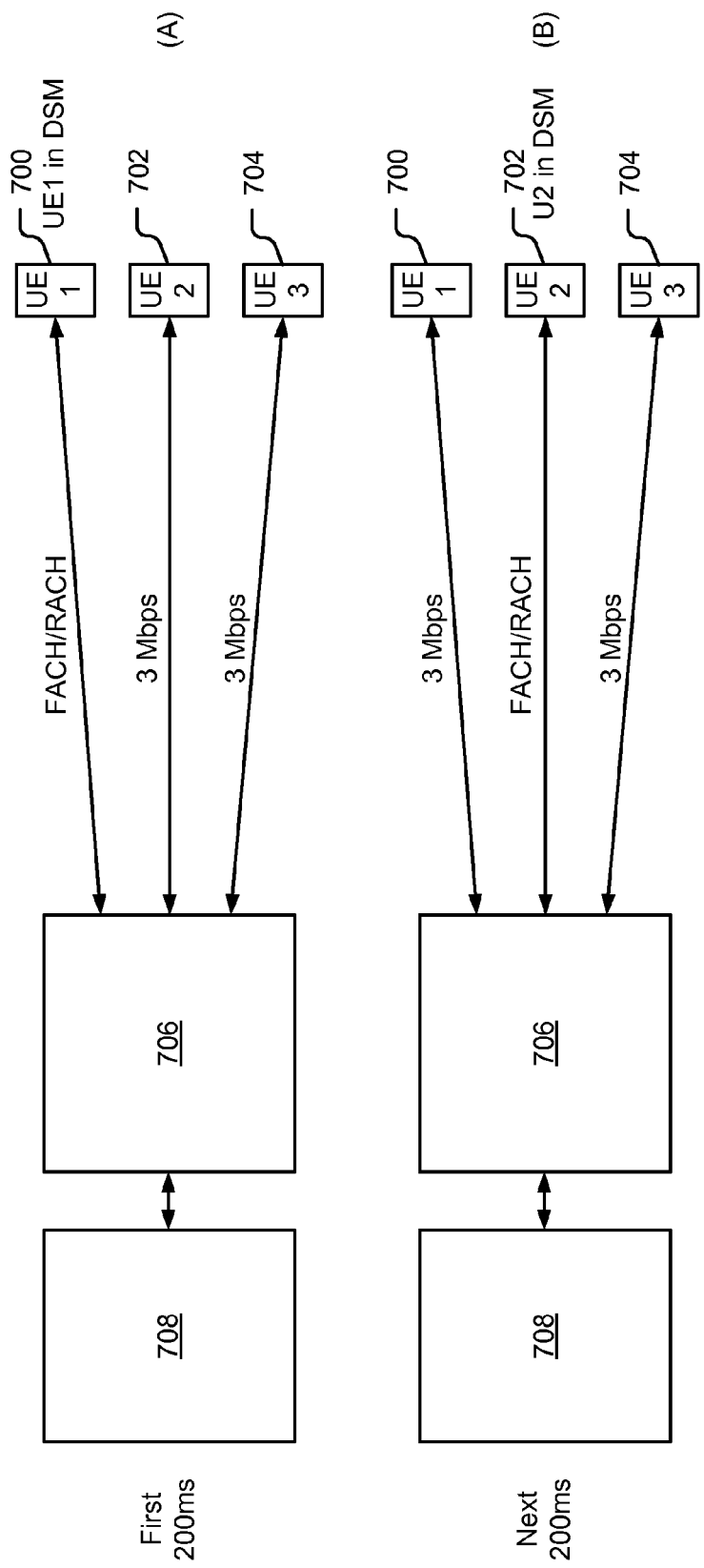
FIGS. 10A and 10B are schematic diagrams of another system configuration comprising the apparatus of any of FIG. 1, 3 or 4.

In the embodiment of FIG. 4, instead of calculation and use of the spreading ratio, N, mentioned above, the reverse path frequency measurement module 400 measures a frequency of ACKs sent as a burst by the application processor 300 over a predetermined period of time, for example exceeding the time required to transmit the contents of the reverse queue 312. The duration of the predetermined period of time again can depend upon the radio access technology employed, for example about 200 ms for High-Speed Downlink Packet Access (HSDPA), and stores the calculated frequency of ACKs, $f_{ACK}$, in the data store 304. Thereafter (FIG. 10), the bit rate extraction module 402 accesses the ACK frequency, $f_{ACK}$, and empties the reverse queue 312 at the frequency/bit rate retrieved, $f_{ACK}$. The bit rate extraction module 402 also received a system clock signal that, in combination with the ACK frequency, $f_{ACK}$, enables the ACKs to be passed to the acknowledgement release module 314 for sending the ACK. Again, the ACKs received in bursts from the application processor 300 are spread out 506 on the reverse path.

In another embodiment, the datagram flow optimizer apparatus 100 can be located in a network protocol stack of an intermediate node, for example a Node B of a UTRAN of the UMTS network. The datagram flow optimizer apparatus 100 can alternatively be supported in a network protocol stack of the UTRAN. In any event, the datagram flow optimizer apparatus 100 behaves in a like manner to that described above in the context of the modem processor 500. However, the data is exchanged between the application processor 300 of the UE unit and the datagram flow optimizer apparatus 100 via an RF interface.

Referring to FIGS. 10A and 10B, the UTRAN described above can be optimised in order to ensure optimum use is made of bandwidth that is unused by an application processor whilst in the deep sleep mode. In this respect, a first UE unit 700, a second UE unit 702 and a third UE unit 704 may each be capable of communicating with a UTRAN 706 via an RF interface. In this example, the first UE unit 700 constitutes the destination node mentioned above, and the second and third UE units 702, 704 constitute other destination nodes. As the UTRAN 706 is part of a UMTS network, the UTRAN is coupled to a gateway 708 to a core IP network (not shown). In this example, the datagram flow optimizer apparatus 100 of the UTRAN may employ a separate queue for each of the UEs. When the datagram flow optimizer apparatus 100 is buffering incoming TCP segments destined for the first UE unit 700, the first UE unit 700 is in a FACH or RACH mode and hence in a deep sleep mode, and the 2 Mbps bandwidth allocated to the first UE unit 700 is reallocated to the second and third UE units 702, 704 so that the second and third UE units 702, 704 each enjoy 3 Mbps of bandwidth each as opposed to 2 Mbps.

Subsequently, the datagram flow optimizer apparatus 100 starts forwarding the buffered TCP segments to the first UE unit 700, but starts buffering TCP segments received and destined for the second UE unit 702. Consequently, in accordance with the above-described policy, the bandwidth allocated for the second UE unit 702 is reallocated to the first and third UE units 700, 704. Hence, UE units that are not receiving TCP segments can enter into a Deep Sleep Mode (DSM).

This pattern of behaviour can be continued in respect of buffering of TCP segments received and destined for the third UE unit 704. Although substantially all the bandwidth used by a dormant UE unit/application processor is reallocated to other active UE units/application processors, the skilled person should appreciate that in other examples at least part of the bandwidth can be reallocated instead of substantially all of the bandwidth used by the dormant device when active.

In order to achieve the increased data rates, the TCP segments received, and forwarded by the datagram flow optimizer apparatus 100 to the UE units not in a deep sleep mode, are transmitted at a higher data rate.

Figure 11:
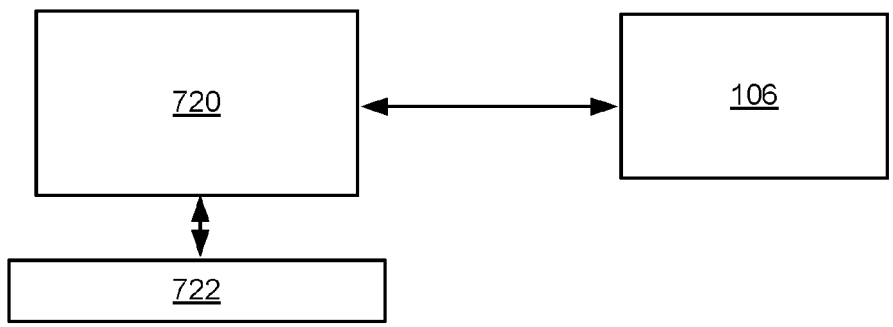
FIG. 11 is a schematic diagram of a further communications system comprising the apparatus of any of FIG. 1, 3 or 4 and that can be implemented in respect of different communications networks.

Although the above examples describe deployment of the datagram flow optimizer apparatus 100 in the context of a network protocol stack in a UTRAN of a Third Generation (3G) communications network, the skilled person should appreciate that the above architecture can be applied in respect of communication of flow control datagrams between an application processor and a processor of any other suitable communications system (FIG. 11). In such an embodiment, a modem stack 720 of an eUTRAN, of a Fourth Generation (4G) communications system, associated with Long Term Evolution (LTE) of the UMTS, or a Wireless Local Area Network (WLAN) 722 may comprise the datagram flow optimizer apparatus 100.

Similarly, the datagram flow optimizer apparatus 100 can be deployed in wired applications, for example a communications card, such as an Ethernet communications card or an Asynchronous Digital Subscriber Line (ADSL) modem, which communicate flow control datagrams, for example TCP segments, to an application processor, the communications card or circuit being coupled to a wired communications network, for example a Local Area Network (LAN) 722.

Figure 12:
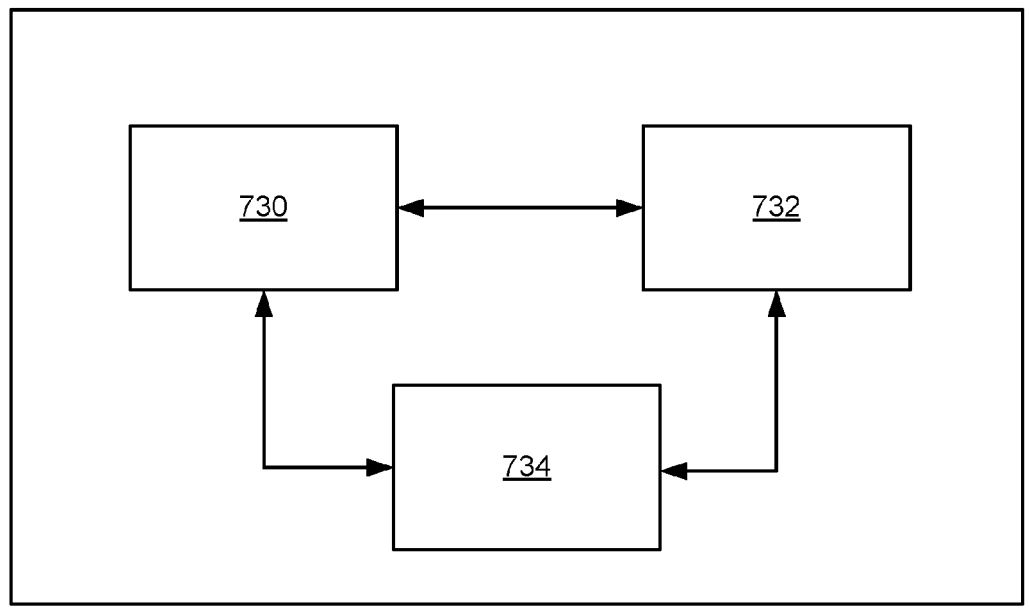
FIG. 12 is a schematic diagram of an embedded communications system comprising the apparatus of any of FIG. 1, 3 or 4.

In a further embodiment (FIG. 12), the datagram flow optimizer apparatus 100 can be deployed in an embedded system as a first thread 730, supporting, for example, a Radio Link Control (RLC) protocol. The first thread 730 is capable of communicating with a second thread 732 supporting, for example a Packet Data Convergence Protocol (PDCP) or an Inter-Processor Communication (IPC) thread, for example an enhanced Universal Asynchronous Receiver/Transmitter (UART) driver, an enhanced USB driver or a shared memory, the first and second threads 730, 732 having access to a memory resource 734. Hence, the second thread 732 is woken in accordance with the manner of operation of the datagram flow optimizer apparatus 100.

As should be appreciated by the skilled person, the above-described threads relate to a protocol architecture for LTE.

It is thus possible to provide an apparatus, system and method that facilitates reduced power consumption by processing devices, for example an application processor, operating in a system comprising the datagram flow optimization apparatus. Additionally, MCPS consumed by the processing device is reduced. Both the power saving and the MCPS consumption reduction are achieved without being at the expense of data throughput in the system. Hence, QoS is not compromised as a result of the power consumption and MCPS savings achieved. Furthermore, the computational overhead required to implement the datagram flow optimization apparatus is minimal. Also, the apparatus, system and method support operation of the IPSEC suite of protocols and permit implementation of the SACK option of the TCP.

Of course, the above advantages are exemplary, and these or other advantages may be achieved by the invention. Further, the skilled person will appreciate that not all advantages stated above are necessarily achieved by embodiments described herein.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

The examples described herein can be implemented, if desired, as respective integrated circuits using any suitable substrate. In this respect, the semiconductor substrate described herein can be any semiconductor material or combinations of materials, such as gallium arsenide, silicon germanium, silicon-on-insulator (SOI), silicon, monocrystalline silicon, the like, and combinations of the above.

As used herein, if the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors and so many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of the datagram flow optimizer apparatus 100 can be circuitry located on a single integrated circuit or within a same device. Alternatively, the datagram flow optimizer apparatus 100 may include any number of separate integrated circuits or separate devices interconnected with each other. For example, the flow control mode detector 102 may be located on a same integrated circuit as the datagram scheduler 106 or on a separate integrated circuit or located within another peripheral discretely separate from other elements of the datagram flow optimizer apparatus 100. Also for example, the datagram flow optimizer apparatus 100 or portions thereof may be soft or code representations of physical circuitry or of logical representations convertible into physical circuitry. As such, the datagram flow optimizer apparatus 100 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A datagram flow optimizer apparatus comprising:
a buffer resource including:
   a first component capable of receiving and temporarily storing a plurality of datagrams in respect of a forward path; and
   a second component capable of receiving and temporarily storing a plurality of acknowledgements of the datagrams received on a reverse path;
a buffer controller arranged to implement, when in use:
   retaining of the datagrams by the first component in response to less than a predetermined threshold number of the datagrams having been stored by the first component, wherein the buffer controller comprises a flow control mode detector, the flow control mode detector being capable of measuring datagram size, measuring datagram inter-arrival time, and detecting an acknowledgement of a datagram on the reverse path, wherein the flow control mode detector is arranged to identify a substantially constant size of received datagrams over a period of time and to identify a substantially constant inter-arrival time over the period of time in respect of the received datagrams; and
forwarding on the forward path of the datagrams retained by the first component in response to the predetermined threshold number of the datagrams being reached, wherein the forwarding comprises forwarding in bursts; and
an acknowledgement regulator arranged to use the second component to manipulate temporal spacing between the acknowledgements of the datagrams on the reverse path in order to even out spacing between transmissions of the acknowledgements by the datagram flow optimizer apparatus on the reverse path.

2. An apparatus as claimed in claim 1, wherein:
the buffer controller is arranged to detect a flow control mode being employed in respect of the forward path and implement the retaining of the datagrams in response to the flow control mode being a delay tolerant flow control mode.

3. An apparatus as claimed in claim 2, wherein the flow control mode is a congestion avoidance phase.

4. An apparatus as claimed in claim 1, wherein the predetermined threshold number of datagrams is set to an initial value and incrementally increased with time.

5. An apparatus as claimed in claim 4, wherein the buffer controller is arranged to receive an advertised window size, the predetermined threshold number of datagrams being incrementally increased up to a proportion of the advertised window size.

6. An apparatus as claimed in claim 1, wherein the temporal spacing between the acknowledgements of the datagrams is defined by a ratio, N, of transmission of datagrams to acknowledgements, the ratio, N, being:

$$N = f_{avg\_downlink} / f_{avg\_uplink}$$

where: $f_{avg\_downlink}$ is an average forward path datagram arrival rate, and $f_{avg\_uplink}$ is an average reverse path acknowledgement arrival rate.

7. An apparatus as claimed in claim 1, wherein the temporal spacing between acknowledgements is defined by a bit rate corresponding to receipt of a plurality of acknowledgements over a predetermined period of time.

8. An apparatus as claimed in claim 1, wherein the acknowledgement regulator is to set a rate of the transmissions by the datagram flow optimizer of the acknowledgements of the datagrams on the reverse path equal to a rate of receipt by the datagram flow optimizer apparatus of the acknowledgements of the datagrams on the reverse path.

9. An apparatus as claimed in claim 1, wherein the forwarding of the datagrams from the buffer resource on the forward path is controlled by the buffer controller so as to ensure a reverse path data rate that corresponds to maintenance of a forward path data rate.

10. A communications system comprising:
an intermediate node comprising:
a buffer resource including:
a first component capable of receiving and temporarily storing a plurality of datagrams in respect of a forward path; and
a second component capable of receiving and temporarily storing a plurality of acknowledgements of the datagrams received on a reverse path;
a buffer controller arranged to implement, when in use:
retaining of the datagrams by the first component in response to less than a predetermined threshold number of the datagrams having been stored by the first component; and
forwarding on the forward path of the datagrams retained by the first component in response to the predetermined threshold number of the datagrams being reached, wherein the forwarding comprises forwarding in bursts; and
an acknowledgement regulator arranged to use the second component to manipulate temporal spacing between the acknowledgements of the datagrams on the reverse path in order to even out spacing between transmissions of the acknowledgements by the datagram flow optimizer apparatus on the reverse path;
a source node arranged to send the plurality of datagrams to a destination node on the forward path via the intermediate node; and
another destination node capable of communicating with the intermediate node; wherein the intermediate node is arranged to assign to the another destination node at least part of bandwidth unused by the destination node during storing of the datagrams by the datagram flow optimizer apparatus, thereby temporarily increasing bandwidth available for communications on the forward path with the another destination node.

11. A system as claimed in claim 10, wherein the intermediate node is capable of communicating with the destination node via a wireless interface.

12. A system as claimed in claim 10, wherein an application processor constitutes the destination node.

13. A system as claimed in claim 12, wherein a User Equipment (UE) comprises the application processor.

14. A system as claimed in claim 10, wherein a Universal Mobile Telecommunications System (UMTS) Terrestrial Radio Access Network (UTRAN) comprises the intermediate node.

15. A system as claimed in claim 10, wherein the intermediate node is electrically coupled to the destination node.

16. A system as claimed in claim 10, wherein the intermediate node is supported by a first thread and the destination node is supported by a second thread.

17. A system as claimed in claim 14, wherein the source node is arranged to send the plurality of datagrams pursuant to a Transmission Control Protocol (TCP).

18. A method of optimizing datagram flow, the method comprising:
receiving a plurality of datagrams in respect of a forward path;
storing the datagrams in a buffer;
determining a number of the datagrams that has been stored in the buffer;
retaining the datagrams in the buffer in response to a number of the datagrams stored in the buffer being less than a predetermined threshold number;
forwarding on the forward path of the datagrams in response to the predetermined threshold number of the datagrams being reached, the forwarding in bursts;
receiving acknowledgements of the datagrams on a reverse path in respect of the forwarded datagrams; and
transmitting the acknowledgements along the reverse path, comprising manipulating temporal spacing between the acknowledgements of the datagrams on the reverse path in order to even out spacing between transmissions of the acknowledgements along the reverse path, the manipulating comprising setting a rate of transmitting the datagrams on the reverse path equal to a rate of receiving the acknowledgements of the datagrams on the reverse path.

19. The method of claim 18, further comprising identifying a substantially constant size of received datagrams over a period of time.

20. The method of claim 18, further comprising identifying a substantially constant inter-arrival time received datagrams over a period of time.

* * * * *